United States Patent

Wade

[15] 3,660,238
[45] May 2, 1972

[54] EXTRACTION OF ASPARAGINASE FROM BACTERIAL CULTURE

[72] Inventor: Henry E. Wade, Kings Bridge Mead, Stratford-Sub-Castle, Salisbury, England

[22] Filed: Aug. 21, 1969

[21] Appl. No.: 852,082

[30] Foreign Application Priority Data

Aug. 23, 1968 Great Britain ................. 40,344/68

[52] U.S. Cl. ........................................................ 195/66 A
[51] Int. Cl. ........................................................ C07g 7/028
[58] Field of Search ............................................ 195/66 A

[56] References Cited

OTHER PUBLICATIONS

Roberts et al. Journal of Bacteriology Vol. 95 No. 6 pp 2117 to 2123 (June 1968)

Primary Examiner—Lionel M. Shapiro
Attorney—Stevens, Davis, Miller & Mosher

[57] ABSTRACT

The enzyme L-asparaginase, used in the treatment of leukemia and disseminated cancer, is extracted in high yield by treating L-asparaginase producing bacteria with strong alkali to release the enzyme from the bacterial cell in soluble form and thereafter isolating and purifying the enzyme by conventional methods.

16 Claims, No Drawings

EXTRACTION OF ASPARAGINASE FROM BACTERIAL CULTURE

The invention relates to the extraction of L-asparaginase from bacterial cultures.

The enzyme L-asparaginase (3.5.1.1. L-asparagine amidohydrolase in the nomenclature of the International Enzyme Commission 1961) exhibits antitumor activity when it is obtained from certain sources. This activity was first detected in guinea pig serum, and was later detected in Escherichia coli and Serratio marcescens. In British Pat. application No. 40343/68 we have disclosed that an L-asparaginase with high antitumor activity may be obtained from cultures of the genus Erwinia and particularly from strains of the species Erwinia carotovora L-Asparaginase offers a new and promising therapy for some cases of leukemia and disseminated cancer. Some case histories in which remission in human leukemia has been obtained by asparaginase therapy have been reported in Journal of the American Medical Association Nov. 1967 Vol. 202 No. 9. p 116.

The extraction of L-asparaginase from bacterial cultures on a large scale is difficult to accomplish with the result that L-Asparaginase is in very short supply, severely handicapping therapeutic use of the enzyme.

Hitherto the extraction of L-asparaginase has been carried out on a large scale by mechanical disruption processes. In such processes the wall of the bacterium is broken by physical or mechanical processes, such as sonication or by grinding the cells with alumina, allowing the cell contents to be released. Subsequently the L-asparaginase is separated from other soluble cell constituents by salt precipitation, normally with ammonium or sodium sulphate. The L-asparaginase precipitated in this way may then be further purified, for example by column chromatography.

According to the invention, a process for the separation of L-asparaginase from a bacterial culture of bacteria containing L-asparaginase comprises subjecting the bacterial culture or the bacterial cells derived therefrom to the action of alkali and preferably to a strongly-alkaline medium to give a bacterial environment having a pH of between about pH 9.0 and 12.5 and preferably 11 and 12.5 whereby a proportion of the cell constituents, including L-asparaginase, is released in the soluble form.

The resulting alkaline solution containing, inter alia, L-asparaginase may then be subjected to any convenient conventional separation procedures in order to separate the L-asparaginase. Typically, these procedures will involve the steps of neutralization of the alkaline solution to precipitate unwanted bacterial cell debris whilst maintaining L-asparaginase in solution; concentration of the L-asparaginase by precipitation from solution with alcohol, by salt precipitation, or by absorption upon a suitable substrate material; and a purification of the L-asparaginase by re-suspension in water, and re-precipitation with alcohol or salt addition, or separation by column chromatography. Those skilled in this art will appreciate that many variations are possible in these isolation procedures, and the order in which they are carried out, without departing from the essence of the invention — the liberalization of L-asparaginase from bacterial culture under strongly alkaline conditions.

Processes for separating L-asparaginase from bacterial cultures in accordance with the present invention may be applied to cultures of Serratia marcescens but are preferably applied to the genus Erwinia, as more fully described in British Pat. application No. 40343/68, particularly the species carotovora, chrysanthemi, aroideae and atroseptica.

Processes in accordance with the present invention rely on the unusually high stability which we have found L-asparaginase obtained from Erwinia and S. marcescens to possess towards alkali. However the process would be expected to be generally applicable to any genus of bacteria which contains a similarly alkali-stable L-asparaginase, providing only that the alkaline media causes the bacterial cell to lyse.

Processes in accordance with the present invention are advantageously carried out by preparing a suspension of a bacterial culture containing L-asparaginase in a suitably buffered medium and then carefully adjusting the pH of the media to between about pH 9 and 12.5 with an alkali such as sodium or potassium hydroxide. At this pH the bacterial cell is caused to lyse, and subsequently L-asparaginase may be isolated from the suspension. A convenient isolation technique comprises neutralizing or mildly acidifying (i.e. not below pH3 to avoid decomposition of the enzyme) the suspension whereby the bulk of the inactive protein and cell debris is precipitated.

Neutralization or mild acidification may be achieved with any convenient acid and typically a relatively weak acid such as acetic acid is used. The L-asparaginase enzyme remains in solution under these conditions and may be isolated from this solution by adding sufficient of a soluble salt e.g. ammonium sulphate, to the solution to displace the enzyme from solution as a precipitate. Alternatively, the enzyme may be precipitated by the addition of an alcohol to the aqueous solution, or the enzyme may be absorbed upon a carboxymethyl cellulose absorbent.

A typical process of separating L-asparaginase in accordance with the invention will not be described by way of example.

Erwinia carotovora (deposited with the National Collection of Plant Pathogenic Bacteria N.C.P.P.B. No. 1065) was grown aerobically on 3.5 percent Light-grade Yeatex (English Grains Co. Ltd.) at 30° C for 8 hr. The bacteria were sedimented by centrifuging and washed at room temperature in a buffer solution comprising 30 mM. of sodium chloride 10 mM of 2-amino - 2 (hydroxymethyl) propane 1:3 diol and 1 mM of ethylenediamine tetra-acetic acid at pH 7.

1000 ml. of a suspension of the bacteria containing 16.7 mg. of bacterial protein / ml. was prepared at room temperature (Stage 1) and Normal (N) sodium hydroxide slowly added with vigorous mixing until a pH of 12 had been reached. After 30 min. (Stage 2), during further mixing, the pH value was adjusted to pH 5.5 by the slow addition of N-acetic acid. The additions of both sodium hydroxide and acetic acid were carefully controlled to avoid local excesses of these reagents.

Sufficient ammonium sulphate was added to produce a level of 35 percent saturation (20°) and inactive protein was removed by centrifugation, leaving the L-asparaginase in the supernatant (Stage 3). A further addition of ammonium sulphate was made to bring the final concentration to 65 percent saturation. The precipitated enzyme was recovered and deposited by centrifuging (Stage 4). It was taken up into an equal weight of water, dialyzed against 0.02M - sodium phosphate buffer pH 6 (0.02M with respect to $Na^+$) and clarified by centrifuging (Stage 5).

The solution of L-asparaginase, at a concentration of about 1000 I.U./ml., was passed through a carboxymethyl cellulose column (Whatman CM52) which had been equilibrated with the same phosphate buffer. About 1 c.c. bed-volume of the cellulose was used for every 20,000 I.U. of enzyme applied. The column with the adsorbed enzyme was washed with 5 vol. of the buffer and that portion above a prominent red-pigmented band was removed and suspended in an equal volume of water. The pH was adjusted to pH 10 by the slow addition of N-NaOH to the stirred suspension of cellulose. The solution of enzyme (about 40 mg. protein/ml.) produced was recovered from the cellulose by filtration through a sintered glass column and displacement of occluded enzyme by 0.01M-sodium carbonate buffer pH 10 (0.02M with respect to $Na^+$) (Stage 6). The extraction efficiency and product activity at each stage of the separation process is illustrated by the following table.

| Stage | | Recovery of Enzyme (%) | Specific Activity (International Units/mg. protein) |
|---|---|---|---|
| 1 | Bacterial suspension | 100 | 3.7 |
| 2 | After adjustment to pH 12 | 88 | 3.7 |
| 3 | Supernatant from centrifug- | | |

| | | |
|---|---|---|
| ing with 35% saturated ammonium sulphate at pH 5.5 | 73 | 29 |
| 4 Deposite from centrifuging with 65% ammonium sulphate | 62 | 53 |
| 5 Dialysed and clarified ammonium sulphate ppt. from Stage 4 | 60 | 60 |
| 6 Carboxymethyl cellulose (CM)-product | 55 | 450–500 |

An examination of the carboxymethylcellulose product (CM product) by electrophoresis and analytical centrifugation revealed the presence of one prominent component with some minor contaminants which represent about 20 percent of the total material.

Less than 10 I.U. of the CM-product introduced intravenously into a C3H mouse after 4 days growth of 6C3HED tumor, caused regression of the tunor. 4 mg. of the CM-product provoked no symptoms of toxicity when introduced into the mouse by the same route.

Clinical trials of L-asparaginase extracted from Erwinia carotovora by processes in accordance with the present invention have shown the presence of minute quantities of material capable of producing a temperature rise in patients to whom the L-asparaginase is given. Whilst not necessarily harmful, such pyrogenic material is clearly undesirable in therapentic materials, and is preferably removed. Conveniently, removal is achieved by a further purification step which comprises contacting a solution of L-asparaginase with an aluminum hydroxide gel whereby the pyrogenic material is substantially completely removed by the gel. Prior contacting of the aluminum hydroxide gel with glutamic acid increases the activity and effectiveness of the gel in pyrogen removal.

L-asparaginase extracted from Erwinia carotovora in accordance with the present invention conforms to a product named as 3.5.1.1. L-asparaginase amido hydrolase in International Enzyme Commission terminology, but appears to differ significantly in properties from previously known L-asparaginase drived for example, from *Escherichia Coli*. Amino acid analysis of samples of L-asparaginase from E. Coli (produced by Farbenfabriken Bayer A.G.) compared with that from *Erwinia carotovora* gave the following results.

Amino Acid

| | Esch. coli | Er. carotovora |
|---|---|---|
| Asp | 180 | 131 |
| Thr | 120 | 89 |
| Ser | 60 | 64 |
| Glu | 84 | 80 |
| Pro | 48 | 49 |
| Gly | 108 | 123 |
| Ala | 120 | 105 |
| Val | 120 | 98 |
| CyS | 6 | <2 |
| Met | 24 | 33 |
| Ile | 48 | 61 |
| Leu | 84 | 104 |
| Tyr | 54 | 48 |
| Phe | 36 | 27 |
| Lys | 84 | 67 |
| His | 12 | 25 |
| Arg | 36 | 68 |
| Trp | 12 | 0 |

Similarly, comparative measurements of the Iso-electric point (by Iso-electric focussing) gave about pH 5.2 (for E. coli) and about pH 8.5 (for Er carotovora); and glutaminase activities of 2–3 percent of asparaginase (for E. coli) compared with 5–7 percent (for Er carotovora). Additionally, the two asparaginase are serologically quite distinct. Antisera raised to each does not cross react with the other asparaginase. The clinical benefit of this is that in cases where treatment with one asparaginase results in the development of sensitivity (an allergic reaction) treatment can be continued with the second asparaginase. Molecular weights of Erwinia — derived asparaginase are normally between about 130,000 and 150,000.

Treatment of leukemia and disseminated cancers is normally carried out by injecting L-asparaginase in a physiological solution such as saline, although it may be possible to achieve oral administration in some circumstances. A typical solution for intravenous injection comprises a 10–20 mg. protein/ml solution of L-asparaginase in physiological saline. Typical dosage rates are between about 0.05 and 5.0 mg per Kg. patient body weight.

I claim:

1. A process for the separation of L-asparaginase from a bacterial culture containing L-asparaginase which comprises subjecting the bacterial culture or the bacterial cells derived therefrom to the action of alkali to give a bacterial environment having a pH between about 9.0 and 12.5, whereby a portion of the bacterial cell constituents including L-asparaginase is released in soluble form to give an alkaline solution of L-asparaginase.

2. A process according to claim 1 wherein the pH is between 11 and 12.5.

3. A process according to claim 1 in which the said bacteria are bacteria of the genus *Erwinia*.

4. A process according to claim 3 in which the bacteria are of the species *Erwinia carotovora*.

5. A process according to claim 3 in the bacteria are of the species *Erwinia aroideae*.

6. A process according to claim 3 in which the bacteria are of the species *Erwinia chrysanthemi* or *Erwinia atroseptica*.

7. A process according to claim 1 in which the said bacteria are bacteria of the species *Serratia marcescens*.

8. A process according to claim 1 in which the L-asparaginase released in soluble form is then isolated from the said alkaline solution.

9. A process according to claim 8 and in which the alkaline solution is treated with acid to precipitate bacterial cell residues whilst maintaining the L-asparaginase in solution.

10. A process according to claim 9 wherein sufficient acid is added to give a pH of between about 3 and 5.

11. A process according to claim 8 wherein L-asparaginase in solution is precipitated by the addition of alcohol.

12. A process according to claim 8 wherein L-asparaginase in solution is precipitated by the addition of a salt to the solution.

13. A process according to claim 8 wherein L-asparaginase is selectively absorbed onto an absorbent substrate.

14. A process according to claim 13 where the absorbent substrate is carboxymethyl cellulose.

15. A process according to claim 8 in which the L-asparaginase is rendered substantially pyrogen-free by contact with an aluminum hydroxide gel.

16. A process according to claim 15 and in which the aluminum hydroxide gel previously has been activated with glutamic acid.

* * * * *